Sept. 16, 1969     R. E. BRICKER ET AL     3,467,074

FEED STABILIZING DEVICE

Filed March 9, 1967     2 Sheets-Sheet 1

INVENTORS
Robert E. Bricker &
Ralph E. Price

BY Mason, Porter, Diller & Brown
ATTORNEYS

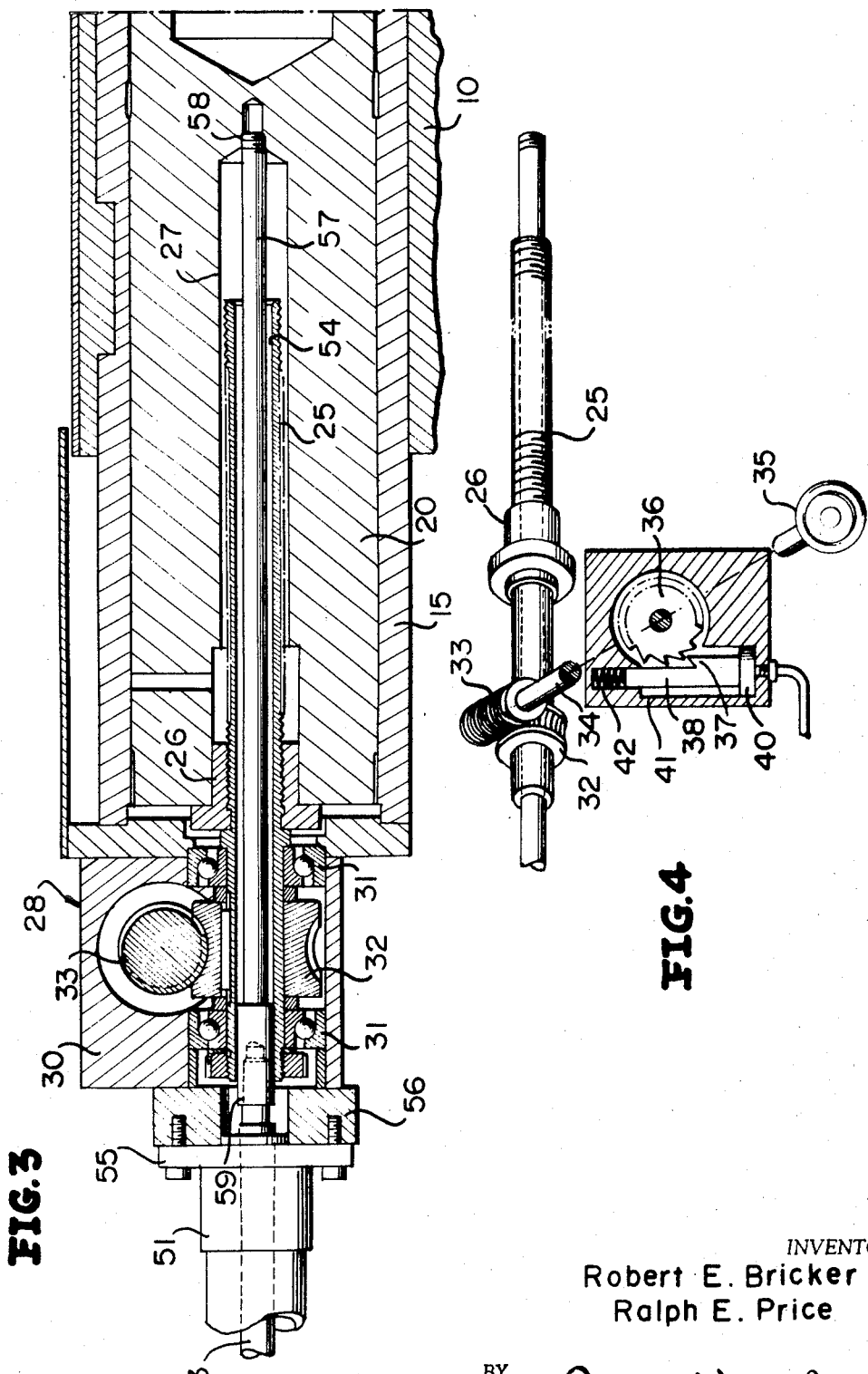

United States Patent Office 3,467,074
Patented Sept. 16, 1969

3,467,074
FEED STABILIZING DEVICE
Robert E. Bricker and Ralph E. Price, Waynesboro, Pa., assignors, by mesne assignments, to Landis Tool Company, Waynesboro, Pa., a corporation of Delaware
Filed Mar. 9, 1967, Ser. No. 621,819
Int. Cl. B24b 57/00
U.S. Cl. 125—11                                  11 Claims

ABSTRACT OF THE DISCLOSURE

The apparatus of this disclosure is a blacklash device or more specifically, a device for stabilizing the relation between the coacting elements of a feed mechanism. It consists of a piston and cylinder attached to a tool support with pressure applied in said cylinder in a direction to maintain a fixed operative relation between the elements of the feed mechanism and between a cutting tool and a workpiece. Each time the feed mechanism is advanced, the pressure on the cylinder is released so that the force imposed on said coacting elements of the feed mechanism does not interfere with the accurate functioning of the feed mechanism.

---

This invention relates to machine tools in general and has to do with stabilizing the relation between a cutting tool and a workpiece.

The invention has special application to grinding machines and relates especially to means for controlling and stabilizing the relation between a grinding wheel and a workpiece during a traverse grinding operation or between a dressing tool and a grinding wheel during a dressing operation with the grinding wheel being considered the workpiece. Although the invention has numerous applications, illustration and description of the invention will be restricted to the application thereof to a grinding wheel dressing mechanism.

The cutting tool in the case of a grinding wheel dressing mechanism is a grinding wheel dressing tool which is advanced and retracted relative to the grinding wheel by means of a feed mechanism which includes a feed screw and nut. Such mechanisms, by their nature, even those which are closely fitted have a certain amount of lost motion or backlash between the feed screw and nut as well as between other co-acting elements in the feed mechanism. Even where said co-acting elements are closely fitted, there is also a certain amount of elastic deformation between said elements because of the force transmitted through them, which affects the relation between the dressing tool and the grinding wheel.

During a dressing operation, backlash between the feed screw and nut may permit accidental endwise movement of the dressing tool during the traverse of the dressing tool across the grinding wheel. This would cause irregularities in the surface of the grinding wheel which would, in turn, be transferred to workpieces being ground, rendering the workpiece unacceptable.

In view of the foregoing, it is an object of the present invention to provide means for eliminating the effect of lost motion and elastic deformation in a feed mechanism uniformly throughout its entire range.

Another object of the invention is to automatically release the stabilizing means when the feed mechanism is operated whereby to avoid interference with the operation of the feed mechanism.

In its preferred form, the invention consists of a hydraulic cylinder and a piston in the cylinder attached to a dresser bar on which the dressing tool is supported for a feeding movement towards the grinding wheel. Means are provided to maintain pressure in the cylinder in the direction to prevent accidental advance of the dressing tool as the tool passes across the grinding wheel. Between passes of the dressing tool across the grinding wheel, it is necessary to advance the dressing tool slightly. In order that the pressure exerted by the stabilizing device between the feed screw and nut does not interfere with the relative rotation of the feed screw and nut required to effect this advance of the dressing tool, the means which control the advance of the dressing tool also release the pressure in the cylinder.

With the above and other objects in view as will hereinafter appear, the nature of the invention will be more clearly understood by references to the folowing detailed description, the appended claims and the several views illustrated in the accompanying drawings.

In the drawings:

FIGURE 3 is an enlarged fragmentary longitudinal sectional view taken through the dressing device and the stabilizing device and shows the specific details of construction thereof.

FIGURE 4 is a perspective view of the feed mechanism with parts diagrammatically shown for purposes of clarity.

Figure 1:
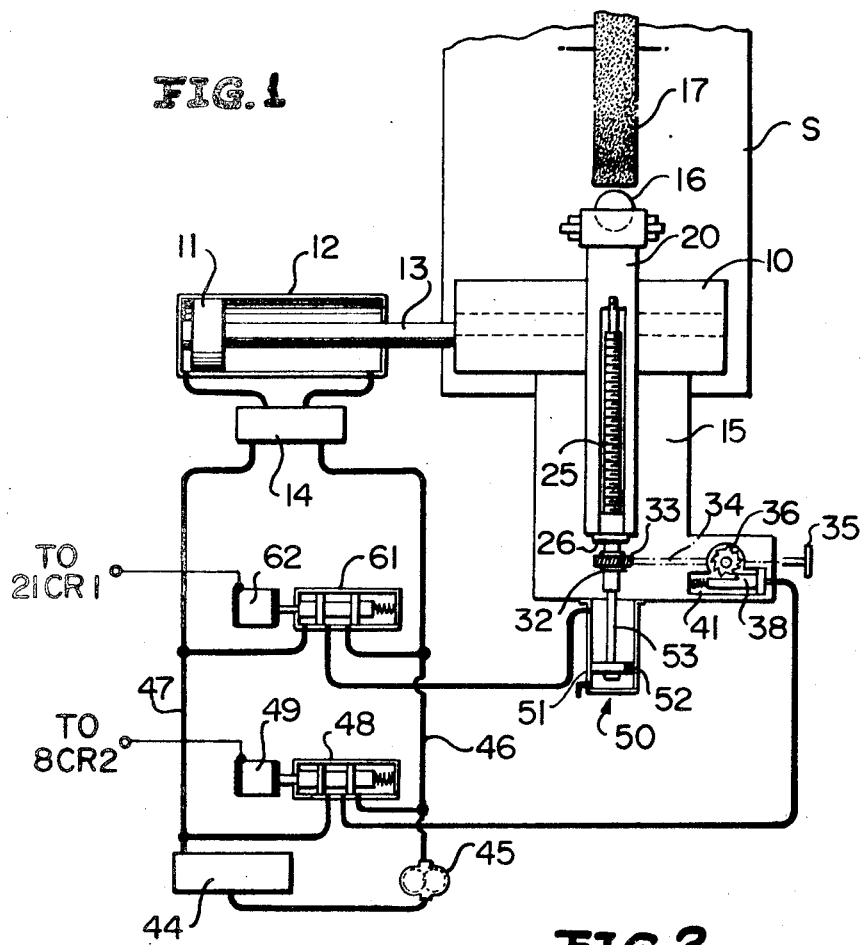
FIGURE 1 is a schematic showing generally the elements of the dressing device and the stabilizing device and includes the hydraulic circuit for controlling the operation of the feed mechanism and stabilizing device.

Referring now to the drawings in detail, it will be seen that there is illustrated in FIGURES 1 and 3 a dressing device which is similar to that disclosed in United States Patent No. 3,121,423, granted Feb. 18, 1964. The dressing device includes a carriage 10 which is mounted on a grinding wheel support S for longitudinal movement thereon by means of a piston 11 and a cylinder 12, the piston 11 having a piston rod 13 which is suitably connected to the carriage 10. The movement of the piston 11 is suitably controlled by means of a valve 14 which is part of a hydraulic system to be described in detail hereinafter.

A cross slide member 15 is slidably mounted on the carriage 10 for positioning a dressing tool 16 in operative relation to a grinding wheel 17 which is mounted on the grinding wheel support S. The dressing tool is supported on a dresser bar 20 which is slidably mounted in the slide member 15 and is adjustable relative to the grinding wheel 17 by means of a feed screw 25 and a nut 26.

Reference is now made to FIGURE 3 in detail wherein it will be seen that the dresser bar 20 is mounted within the slide member 15 in a conventional manner. The dresser bar 20 has a central bore 27 into which the feed screw 25 projects. The nut 26 projects into the bore 27 at the end of the dresser bar 20 remote from the dressing tool 16 and is suitably fixed thereto against relative rotation. The feed screw 25 is threadedly engaged with the nut 26 and projects therethrough in both axial directions.

A drive unit, generally referred to by the numeral 28, for the feed screw 25 is secured on the slide member 15 in a fixed position. The drive unit 28 includes a housing 30 which has mounted therein suitable bearings 31 mounting the feed screw 25 for rotation and generally supporting the same against axial movement. The feed screw 25 has keyed thereon intermediate the bearings 31 a worm wheel 32 which is driven by means of a worm 33. As is best illustrated in FIGURE 4, the worm 33 is carried by a shaft 34. The shaft 34 is suitably journalled within the housing 30 for rotation.

The shaft 34 is provided at one end thereof with a hand wheel 35 for rapid rotation of the worm 33. The shaft 34 is also provided with a ratchet drive which includes a ratchet wheel 36 which is secured to the shaft 34. The ratchet 36 is actuated by means of a pawl 37 which is schematically illustrated as being carried by a piston rod 38 of a piston 40 which is mounted within a cylinder 41. The piston rod 38 has associated therewith a return spring 42. It is to be understood that when fluid is directed into the cylinder 41, the piston 40 is moved in a direction to engage the pawl 37 with the ratchet wheel 36 and to rotate the feed screw 25 in a direction to advance the dresser bar 20.

Referring once again to FIGURE 1, it will be seen that the hydraulic system is illustrated for effecting longitudinal movement of the carriage 10 and the advancing of the dresser bar 20. The hydraulic system includes a reservoir 44 to which there is coupled a pump 45. A pressure line 46 extends from the pump 45 while a return line 47 empties into the reservoir 44. The flow of fluid to the cylinder 41 is controlled by means of a valve 48 which has a solenoid 49 for positioning the same. The normal position of the valve 48 is one wherein the cylinder 41 is in communication with the return line 47 and the pawl 37 is in its retracted position of FIGURE 4.

The cylinder 12 is connected to the pressure line 46 and the return line 47 by means of a conventional valve 14 which may be actuated in any desired manner to effect the shifting and positioning of the piston 11.

It will be readily apparent that the fit between the feed screw 25 and the nut 26 cannot be such that under all operating conditions, including one of wear, that there can be no relative axial movement between the feed screw 25 and the nut 26. As a result, it is desired that there be axial pressure engaging relation between the feed screw and the nut in a predetermined direction. In the case of a dressing tool and a grinding wheel, it is preferred that the pressure engagement be in a direction of retraction of the dresser bar 20. To this end, there is provided a stabilizing device which is generally referred to by the numeral 50. The stabilizing device includes a cylinder 51 and a piston 52 having connected thereto a piston rod 53.

Referring now to FIGURE 3 in particular, it will be seen that the feed screw 25 is of a tubular construction with a bore 54 therethrough. The cylinder 51 is provided with a mounting flange 55 which is utilized in the mounting of the cylinder 51 on a support element 56 which may be a portion of the drive unit 28. It is to be noted that in this manner the stabilizing device 50 may be conveniently mounted in alignment with the feed screw 25.

The piston rod 53 is connected to the dresser bar 20 by means of an adapter rod 57 which extends through the feed screw 25 and is threadedly engaged with the dresser bar 20 as at 58. The opposite end of the adapter rod 57 is connected to the piston rod 53 as at 59.

The purpose of the adapter rod 57 is to avoid the possibility of misalignment between the piston rod 53 and the feed screw 25 which would interfere with the adjusting or positioning movements of the dressing tool 16 and also to apply the desired force to the feed screw 25 through the dresser bar 20 rather than directly to the feed screw 25 and leaving the dresser bar 20 and the dressing tool 16 uncontrolled.

The operation of the stabilizing device 50 is controlled by means of a valve 61 which is coupled to the pressure line 46 and the return line 47 and to the rod end of the cylinder 51, as is shown in FIGURE 1. The normal position of the valve 61 is one wherein fluid under pressure is directed into the cylinder 51 so as to maintain the stabilizing force on the dresser bar 20. Shifting of the valve 61 to a position wherein the rod end of the cylinder 51 is connected to the return line 47 is controlled by means of a solenoid 62.

Operation

Figure 2:
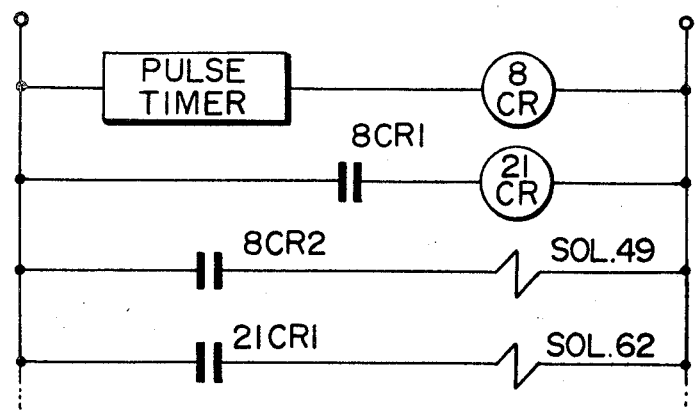
FIGURE 2 is an electric circuit diagram.

Valve 61 is normally in position to direct fluid under pressure to the rod end of the cylinder 51. When the dressing operation is initiated, a dresser signal contact which may be provided by a pulse timer, is closed in the circuit to relay 8CR (FIGURE 2). At the same time contact 8CR1 is closed in the circuit to relay 21CR. Contact 8CR2 closes to energize solenoid 49 which shifts the valve 48 to advance the ratchet wheel 36 one or more increments thereby rotating the feed screw 25 and advancing the dressing tool 16 by a like number of increments.

The solenoid 62 is simultaneously energized by the closing of the contact 21CR1, shifting the position of the valve 61 to connect the rod end of the cylinder 51 to the return line 47, thus relieving the stabilizing pressure on the feed screw 25 and nut 26 and permitting free rotation of the feed screw 25 to advance the dressing tool 16 for the next pass across the grinding wheel 17.

It is to be understood that the relays 8CR and 21CR are energized only momentarily by the pulse timer. When de-energized, contact 8CR2 opens to de-energize solenoid 49, permitting the resetting of the ratchet mechanism. Contact 21CR1 opens to de-energize the solenoid 62, permitting the valve 61 to be shifted to the left again to apply pressure in the rod end of the cylinder 51 for another pass of the dressing tool 16 across the grinding wheel 17.

Although the cutting tool has been specifically illustrated and described as being a dressing tool and the workpiece has been specifically illustrated and described as being a grinding wheel, it is to be understood that the invention is not so limited. For example, in a grinder, the cutting tool could be the grinding wheel. In a lathe, the cutting tool would be the normal lathe tool.

Although only a preferred embodiment of the invention has been specifically illustrated and described herein, it is to be understood that minor variations may be made in the feed mechanism and the stabilizing device without departing from the spirit and scope of this invention.

We claim:
1. In a machine tool,
   (a) a tool support,
   (b) a cutting tool on said tool support,
   (c) a work support,
   (d) means mounting said tool support for movement towards said work support,
   (e) a feed mechanism for effecting movement of said tool support including,
   (f) a feed screw and nut,
   (g) means to effect relative rotation between said feed screw and nut to advance said cutting tool toward said work support,
   (h) means for continuously stabilizing the relation between said feed screw and nut in one direction,
   (i) and means for rendering said stabilizing means inoperative when said feed mechanism is actuated.
2. The machine tool of claim 1 wherein said stabilizing means and said means to effect relative rotation are both fluid actuated.
3. The machine tool of claim 1 wherein said means for rendering said stabilizing means inoperative is automatically activated when said feed mechanism is actuated.
4. The machine tool of claim 1 wherein
   (a) said stabilizing means includes a piston and cylinder,
   (b) a valve normally operative for supplying fluid under pressure to said cylinder,
   (c) and said means for rendering said stabilizing means inoperative including means for shifting said valve to a position relieving fluid pressure in said cylinder.
5. The machine tool of claim 1 wherein
   (a) said stabilizing means includes a piston and cylinder,
   (b) a first valve normally operative to supply fluid under pressure to said cylinder,
   (c) said means to effect relative rotation includes a second piston and cylinder,
   (d) a second valve for supplying fluid under pressure to said second cylinder,

(e) said second valve being normally positioned to maintain said second piston in an inoperative position,
(f) and said means for rendering said stabilizing means inoperative and said means for actuating said feed mechanism, including means for simultaneously shifting said first and second valves.

6. The machine tool of claim 5 wherein said means for simultaneously shifting said valves includes
(a) a solenoid type positioner for each valve,
(b) and a single control for said solenoid type positioner.

7. The machine tool of claim 1 wherein
(a) said machine tool is a grinder,
(b) said cutting tool is a grinding wheel dresser,
(c) and said work support carries a grinding wheel.

8. The machine tool of claim 1 wherein
(a) said feed screw is tubular,
(b) and said stabilizing means has a connecting member extending through said feed screw and directly connected to said tool support.

9. The machine tool of claim 1 wherein
(a) said feed screw is hollow, and
(b) said stabilizing means is carried by said tool supporting mounting means and is in the form of a piston and cylinder having a piston rod coupled directly to said tool support by a rod passing through said feed screw.

10. The machine tool of claim 9 wherein
(a) said feed screw is rotatable,
(b) said means to effect rotation includes a drive unit mounted on said tool support mounting means,
(c) and a fluid motor mounted on said drive unit.

11. In a grinding machine,
(a) a grinding wheel support,
(b) a grinding wheel rotatably mounted on said wheel support,
(c) a dressing tool support,
(d) a wheel dressing tool on said dressing tool support,
(e) means for effecting relative transverse and longitudinal movement of said dressing tool and said grinding wheel,
(f) a feeding mechanism for effecting said transverse movement including a feed screw and nut, one of which is attached to said dressing tool support,
(g) means to effect relative rotation between said feed screw and nut to advance said dressing tool toward said grinding wheel,
(h) means for continuously stabilizing the relation between said feed screw and nut in one direction, and including a member movable axially through said feed screw and having one end connected to said dressing tool support.

References Cited
UNITED STATES PATENTS

| | | | |
|---|---|---|---|
| 2,178,875 | 11/1939 | Kearns | 125—11 X |
| 1,832,684 | 11/1931 | Bath | 125—11 |
| 2,251,961 | 8/1941 | Snader | 51—95 |
| 3,009,455 | 11/1961 | Price | 125—11 |
| 3,121,423 | 2/1964 | Price et al. | 125—11 |

LESTER M. SWINGLE, Primary Examiner

U.S. Cl. X.R.

51—165